Nov. 12, 1940.   H. MAYER   2,221,102

PUSH-PULL AMPLIFIER CIRCUIT

Filed June 8, 1937

INVENTOR
HANS MAYER
BY
*H. S. Grover*
ATTORNEY

Patented Nov. 12, 1940

2,221,102

UNITED STATES PATENT OFFICE 2,221,102

PUSH-PULL AMPLIFIER CIRCUIT

Hans Mayer, Berlin-Charlottenburg, Germany, assignor to Siemens & Halske Akt., Siemensstadt, near Berlin, Germany, a corporation of Germany Application June 8, 1937, Serial No. 146,996
In Germany June 10, 1936

3 Claims. (Cl. 179—171)

A type of push-pull amplifier is known in the art in which, with a view to causing the necessary phase opposition, a second tube is employed whose grid circuit is fed from the plate circuit of the first tube.

One of the objects of the present invention is to avoid certain disadvantages hereinafter pointed out of such prior art amplifiers.

Figure 1:
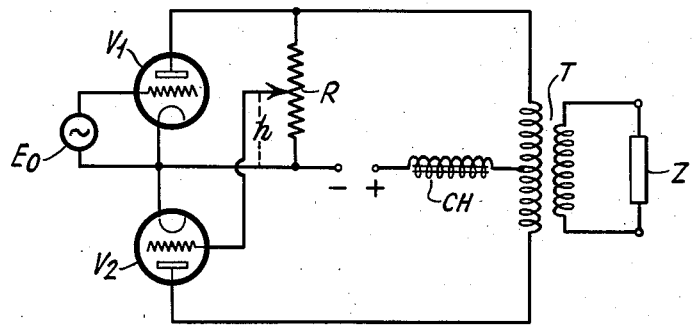
Figure 2A:
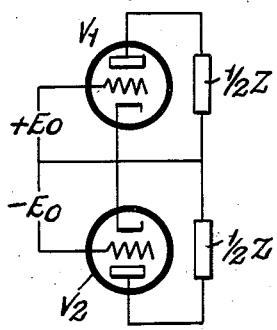
Figure 2B:
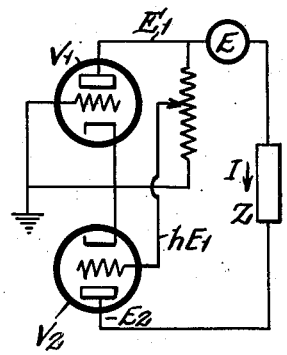

The invention will be described in connection with the accompanying drawing, wherein Fig. 1 illustrates a known push-pull amplifier circuit, Figs. 2A and 2B illustrate circuits which will serve to explain the present invention, and Fig. 3 discloses a circuit which embodies the present invention.

Referring now to Fig. 1, the circuit shown is that of a known push-pull amplifier utilizing first and second tubes $V_1$ and $V_2$, respectively.

The grid circuit of the second tube $V_2$ is impressed with a voltage which is derived from across the resistance R included in the plate circuit of the first tube $V_1$, while the signal input potential to be amplified $E_0$ is fed to the input circuit of tube $V_1$. The load resistance Z is normally connected by means of a transformer T with the plate circuits of the two tubes. Inasmuch as the voltage in the plate circuit is in phase opposition to the input potential, the two tubes will, at their input ends, be excited in phase opposition with the result that the arrangement operates like a normal or conventional push-pull amplifier, though with this advantage that a distinct input transformer having a tapped secondary winding becomes superfluous. The choke-coil CH which is inserted in the joint plate circuit may be used for the purpose of making the two plate circuits independent of each other for alternating current.

However, from the viewpoint of energy adaptation of the load resistance to the tubes, there are discovered certain disadvantages in this circuit scheme. While in a normal push-pull arrangement the resultant inner resistance, as is well known, is equal to $2R_i$ (where $R_i$ is the inner resistance of a tube), the circuit shown in Fig. 1 behaves as if the inner resistance were not $2R_i$, but rather $$R_i\left(2+\frac{h}{D}\right)$$

where D is the reciprocal of the amplification constant of the tube $$\left(\frac{1}{\mu}\right)$$

and $h$ is the part of the plate alternating voltage which is impressed upon the grid of the tube $V_2$ in order that both tubes may be loaded and be operated at the same points on the straight portion of the characteristic.

The quotient $$\frac{h}{D}$$

has the value 2, if the term $h$ is so chosen that both tubes are worked to identical degrees. What then results is a resultant inner resistance of $4R_i$ contradistinct from what is obtained in the normal push-pull scheme where it is $2R_i$. When matched to the said raised inner resistance, the amplifier works no longer under conditions which are most favorable from the viewpoint of maximum power or output, and this is undesirable.

Now, this shortcoming is obviated according to the present invention by that part of the plate alternating potential of the first tube is impressed upon the very grid of the said tube. By this step, the resultant inner resistance may be reduced to the value $2R_i$, so that the circuit becomes equivalent to the conventional push-pull circuit also when looked at from the viewpoint of adaptability.

Figure 3:
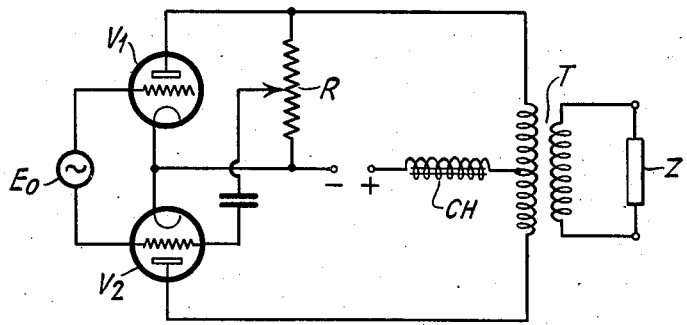

Fig. 3 shows an exemplified embodiment of the basic idea of the invention. The distinction in contrast to Fig. 1 is that the potential $E_0$ to be amplified is active no longer between the grid and the filament of the first tube, but rather between the grids of both tubes. Hence, in the grid circuit of the first tube $V_1$ there is thus active not merely the signal or input potential $E_0$ to be amplified, but in series therewith also the voltage which has been tapped across resistance R, while upon the grid of the tube $V_2$ will act only this tapped voltage.

The following analysis will serve to explain the improved operation afforded by the present invention. Fig. 2A shows a conventional push-pull amplifier. The voltage on one plate is $$\pm \frac{E_0 \mu \tfrac{1}{2} Z}{R_i + \tfrac{1}{2} Z}$$

as is well known, where $\mu$ = the amplification constant of the tube, or $1/D$. Hence, if we wish to obtain symmetrical grid excitation for the lower tube $V_2$ from the plate voltage of the upper tube $V_1$ we must take off a fraction $h$ of the plate voltage of the upper tube such that $$h \frac{E_0 \mu \tfrac{1}{2} Z}{R_i + \tfrac{1}{2} Z} = E_0$$

or $$\mu h = \frac{R_i + \tfrac{1}{2} Z}{\tfrac{1}{2} Z}$$

In particular, if the load $\tfrac{1}{2}Z$ of each tube is matched to its inner resistance $R_i$ the value of $\mu h$ becomes 2.

The various currents flowing in the circuit of Fig. 1 are exactly the same as in Fig. 2A, which is the ordinary push-pull amplifier. However, when we examine the behaviour of the circuit of Fig. 1 when a voltage is impressed in the output circuit and not in the input a difference between Fig. 1 and Fig. 2A is discovered. Referring to Fig. 2B which is the same as Fig. 1 arranged to show a voltage $E$ impressed in the load circuit, the resulting plate potentials being $E_1$ and $-E_2$, and the resulting current being 1, we may write three equations as follows:

(1)     $E - IZ = E_1 + E_2$
(2)     $E_1 = IR_i$
(3)     $E_2 = E_1 + \mu h E_1$

The last equation may be explained by considering that in order to produce through the lower tube $V_2$ the same current $(I)$ that is caused to flow through the upper tube $V_1$ by the plate voltage $E_1$ we must impress on the lower tube two voltages, one being of magnitude $\mu$ ($hE_1$) which merely neutralizes the opposite sign voltage $hE_1$ on its grid, and the other being of the amount $E_1$ that would be required to produce the current $I$ if there were no grid potential.

These three equations are readily solved to give $$\frac{E}{I} = 2R_i + \mu h R_i + Z$$

hence the apparent inner resistance of the amplifier is $R_i(2+\mu h)$. If it is now assumed that the load $Z$ was chosen to match the tube impedance for the condition where the impressed voltage is on the input side of the amplifier, namely $Z=2R_i$ as mentioned above, then the value of $\mu h$ required, as also mentioned above, is 2. Hence the effective tube resistance of Fig. 1 as measured from the output circuit and with $h$ chosen suitably for operating with an exact impedance match between amplifier and load, is $4R_i$ which is twice as great as in the case of an ordinary push-pull amplifier. This increase in effective amplifier impedance measured from the output side reduces the damping action of the amplifier upon transient vibrations of a loud-speaker used as a load and hence is deleterious to faithful reproduction of sound.

A qualitative visualization of the difference in apparent resistance between Figs. 2A and 2B may be obtained by considering that when voltage is applied in the output of Fig. 2B, the resistance of the tubes is necessarily increased by the fact that some voltage is applied to the grid of the lower tube in a sense to oppose the flow of current therethrough while in Fig. 2A no voltage is impressed on either grid. Similarly the operation of circuit Fig. 3 may be explained by observing that when voltage is impressed in the output circuit, the resistance of the amplifier system is simultaneously increased by the impression of a certain amount of voltage on the grid of the lower tube $V_2$ in a sense to oppose flow of current, and decreased by the impression of this same amount of voltage on the grid of the upper tube $V_1$ in a sense to facilitate the flow of current. Since these two actions offset each other the resultant current is substantially the same as if neither grid were supplied with any voltage, hence the effective internal impedance of the amplifier of Fig. 3 is the same as that of the ordinary push-pull amplifier of Fig. 2A, namely $2R_i$, but the advantage is retained of dispensing with a differential input transformer.

While it is true that with the circuit according to the invention there is a certain loss of gain which, when both tubes are operated at the same point of their characteristics, amounts to around 0.7 neper, this circumstance becomes negligible and immaterial due to the fact that in power or end stages the chief desideratum is a high undistorted power delivery rather than high gain. As to the rest, a scheme of the sort here disclosed results in a reduction of non-linear distortion.

What is claimed is:

1. An amplifier arranged for push-pull operation comprising a load circuit, first and second tubes having their cathodes maintained at a common potential and their plates connected to opposite ends of said load circuit, means for impressing in the grid circuit of the second tube an alternating voltage equal to a fraction of the plate alternating voltage of the first tube, and means for impressing in the grid circuit of the first tube a voltage equal to the sum of two voltages, one of which is said fraction of the plate alternating voltage of said first tube, and the other of which is the input voltage to be amplified.

2. An amplifier according to claim 1 wherein the tubes are similar to each other, and the fraction of the plate alternating voltage impressed in the grid circuit of the second tube is adjusted to a value approximately equal to twice the reciprocal of the amplification constant of the tubes.

3. An amplifier according to claim 1, wherein the two voltages impressed in the grid circuit of the first tube are connected in series between the grid and cathode of said tube.

HANS MAYER.